April 7, 1925.  1,532,835
A. SCHLABACH
PORTABLE PARTIAL LOAD AND FULL LOAD WEIGHING DEVICE
Filed Jan. 9, 1924  3 Sheets-Sheet 1
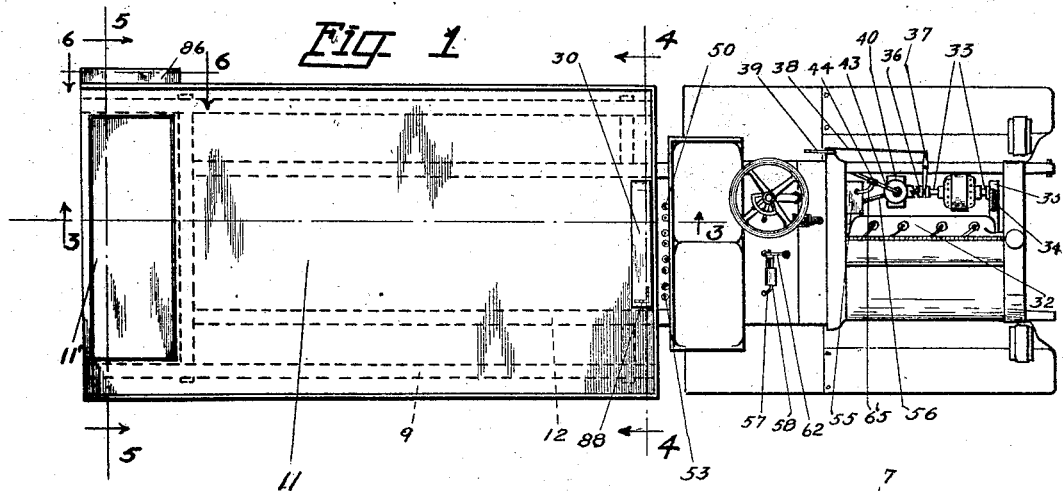
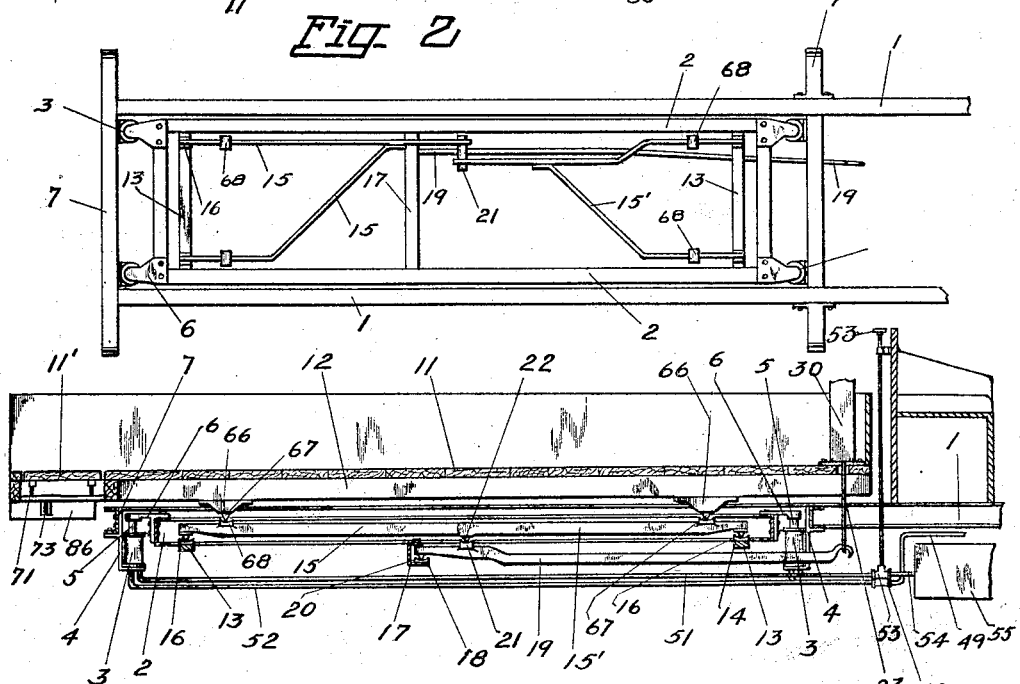
Inventor
Allen Schlabach
Attorney

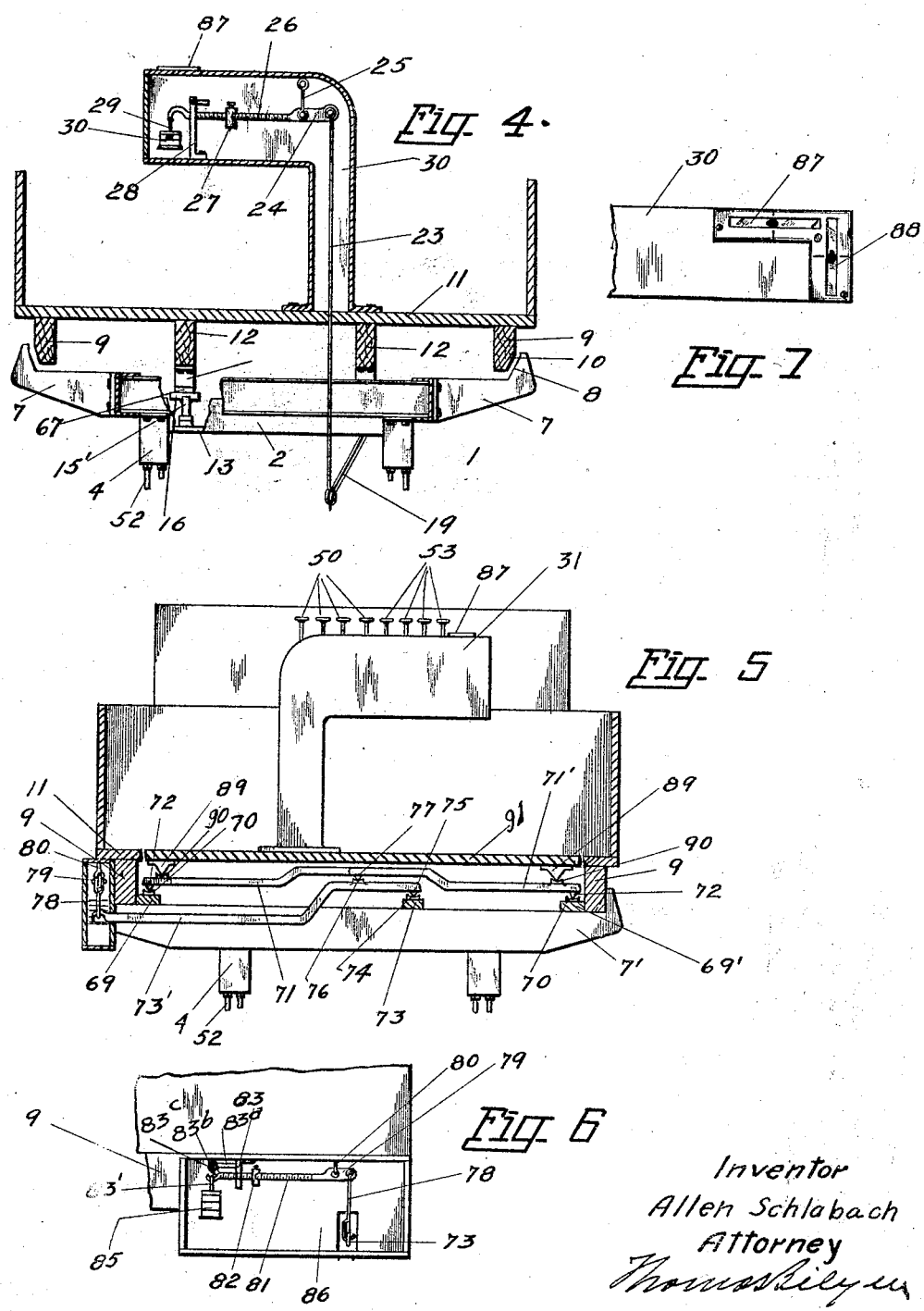

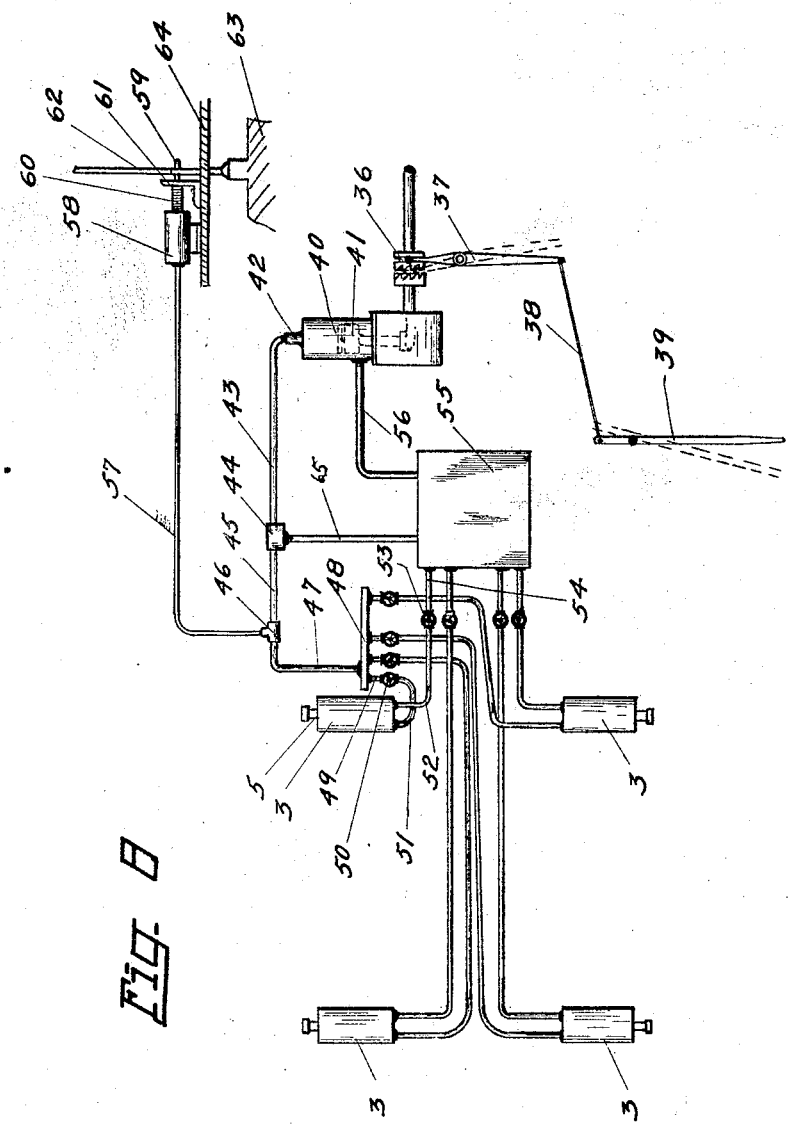

Patented Apr. 7, 1925.

1,532,835

UNITED STATES PATENT OFFICE.

ALLEN SCHLABACH, OF HUBBARD, OREGON.

PORTABLE PARTIAL-LOAD AND FULL-LOAD WEIGHING DEVICE.

Application filed January 9, 1924. Serial No. 685,189.

*To all whom it may concern:*

Be it known that I, ALLEN SCHLABACH, a citizen of the United States, residing at Hubbard, in the county of Marion and the State of Oregon, have invented a new and useful Improvement in a Portable Partial-Load and Full-Load Weighing Device, of which the following is a specification.

My invention relates to weighing devices, and more particularly to weighing devices for use on portable vehicles and the like, where freight is being added from station to station as in trucks or motor vehicles wherein the same are being used for the transportation of freight and the like.

In this character of hauling it is desirable to weigh partial shipments that are being loaded and unloaded from station to station, and it is desirable to weigh these partial shipments as the same is loaded or is being unloaded, it is also desirable to weigh the entire load wherein the entire shipment of freight is destined from one station to another, or from one shipper to another, and to accomplish this result I have provided a weighing device that primarily consists of a main weighing frame to which are attached all weighing mechanisms and onto which the load is shifted by power operating mechanism when the weighing is to be done, and at all other times the load is carried directly upon the truck frame. A second weighing mechanism is also supported within the main weighing frame and is located at the rear of the vehicle, that may be used for weighing partial shipments, or partial load shipments.

To weigh correctly I have provided means for leveling the weighing mechanism both athwart the scale as well as longitudinally of the same, the raising and lowering of the load is accomplished by hydraulic means, through cylinders having pistons operating therein, the load being carried through piston rods resting upon pistons within the cylinders. To make the operation of the scale effective, only, when the vehicle is devoid of locomotion I have provided locking means for the transmission that is operative when the load is being carried upon the pistons and piston rods and inoperative when the load has been released. The subframe of the scale is independent of the main vehicle frame and is susceptible of being raised and lowered through the hydraulic means. To prevent the raising of the subframe above the stop position, the liquid is pumped against a pressure sufficient to raise the load, and in the event that one of the pistons reaches the maximum stroke provided in advance of the others the pump will continue to function until one or all of the remaining cylinders have reached the full stroke at which time a release valve will then permit the flow of the surplus pumped material to return to the reservoir until the pump ceases operation, the scale may then be leveled by the release of the pumped liquid from the high corner until a level has been attained.

For a better and more detailed description of my invention reference is had to the accompanying drawings, in which—

Fig. 1 is a plan view of the portable vehicle, here shown as a motor truck with the weighing platforms in position upon the platform of the vehicle, and with the hood of the motor removed to show the position of the pump for operating the pistons within the cylinders for raising the subframe to which is attached the weighing mechanisms. Fig. 2 is a plan of the vehicle frame and shows the subframe in position within the vehicle frame, the weighing levers of the scale are here shown as the same apply to the primary scale, in this view are also shown the cylinders at each corner for raising and lowering the subframe. Fig. 3 is a section view of the rear portion of the vehicle and is made to illustrate the weighing mechanisms and the main and subframes, this section is taken on line 3—3 of Fig. 1 looking in the direction indicated by the arrows. Fig. 4 is a section view taken on line 4—4 of Fig. 1 looking in the direction indicated by the arrows. Fig. 5 is a section made on line 5—5 of Fig. 1 looking in the direction indicated by the arrows. Fig. 6 is a section view taken on line 6—6 of Fig. 1 looking in the direction indicated by the arrows. Fig. 7 is a plan view of the spirit levels placed at a convenient place upon the weighing platform and which are used as indicators to determine when the weighing platform is level when the load to be weighed has been placed thereupon. Fig. 8 is a diagrammatical view of the control levers, the pressure pump, the piping systems, the distribution tanks, the cylinders and pistons, the valves, the gear shift lever and the locking device for locking the gear shift levers.

Similar reference characters refer to similar parts throughout the several views.

1 is the motor vehicle frame having mounted within the same a subframe, each corner of which is indirectly resting upon a piston rod. Attached to the main frame are brackets 4 that support the hydraulic cylinders 3 and operating within the cylinders are pistons and piston rods 5 so that when pressure is pumped into the cylinder and beneath the piston the piston and piston rods are caused to raise or be elevated. Attached to each corner of the subframe and directly above the pistons and piston rods of the cylinders are brackets 6 and against which the pistons and piston rods engage when raised and they being of sufficient rigidity to raise the subframe and the load when raised the subframe is raised above and clear of the main frame and in so doing an accurate weigh is made possible. 7 are supporting brackets attached to the main frame of the vehicle as shown in Fig. 4 and having sloping edges 8 and sills 9 are a part of the platform running lengthwise of the same and they also have sloping sides as shown at 10, the object of these sloping surfaces being to spot the platform in desired position when the platform is being lowered after each weigh, since it is essential that the load be carried directly upon the main vehicle frame during the transporting of the load from place to place, the engagement of these two sloping surfaces spots the same in correct position. 12 are center sills running lengthwise of the platform. Secured to the subframe and rigidly connected are supports 13 for the weighing mechanisms and mounted upon the same are hardened members 14 that support the lever system of the primary scales. 15 and 15' are the primary scale frames and attached thereto and directly above the hardened members are knife edges 16. Attached to the subframe are cross supports 17 and attached thereto are hardened members 18. 19 are scale bars having secured thereto hardened knife edges 20 that rest upon the hardened members 18. 21 are hardened members secured to the bars 19 and 22 are hardened knife edges resting thereupon. 23 is the vertical scale rod that engages the rod 19 and connects the same with the graduated scale beam 24, 25 is the beam support and 26 are the graduations upon the graduated beam and the same may be made to indicate any desired unit of weight. Mounted upon the graduated beam is the sliding weight 27 and 28 is a locking device for locking the graduated beam when not in use or when the vehicle is being moved from place to place and 30 are weights that were placed at the end of the graduated beam being supported upon the pendulum rod. 31 is a scale housing.

32 is the motor for supplying power for the portable vehicle here shown as an engine of the hydrocarbon type, and 33 is the generator shaft that is supplied power from the motor through a train of gearing 34 that are housed within the housing 35. 36 is a clutch placed upon the generator shaft and connects the same to the pump shaft. 37 is a lever arm for actuating the clutch and 38 is a connecting rod to the clutch lever and 39 is the control lever located at a convenient location for the operation of the clutch by the driver of the vehicle. 40 is a pump housing and 41 is a piston within the cylinder of the pump housing so made that liquid under pressure may be sucked into the cylinder and forced therefrom under pressure into the pipe 43 past the check valve 42. 44 is a safety valve so made that should an excessive pressure be created within the system the liquid being pumped would return directly to the sump tank 55. 45 is a pipe connection between the safety valve and the T 46 and 47 is a bent pipe connecting one leg of the T and the distributing head 48 out of which lead pipes connecting the same with the hydraulic cylinders. 49 are pipe nipples and 50 are valves between the nipples and the hydraulic cylinders. 52 is a return pipe connecting the cylinders with a valve 53 and 54 are nipples connecting the same with a sump tank 55 and 56 is a pipe connection connecting the sump tank with the suction end of the hydraulic piston type pump. The liquid to be pumped is maintained within the sump tank and into which the same drains when released from the hydraulic cylinders when the weigh has been completed by the vehicle operator. 57 is a pipe connection between the T 46 and a cylinder 58 having a piston and piston rod therein, the outer end of the piston rod is shown at 59 and 60 is a spring secured to the piston rod and to the outer end of the cylinder, 61 is a bracket for supporting the outer end of the piston rod 59 and 62 is the gear shift lever and 63 is the transmission case of a motor vehicle of the usual type, and 64 is the floor board of the motor vehicle. When the hydraulic pump is started pressure is created within the distributing system and the liquid under pressure passes through the pipe 57 to the cylinder 58, this pressure extends the piston and piston rod 59 against the tension spring 60 and therefore locks the transmission lever 62 in position and so long as the pressure remains within the distributing system the lever remains in locked position, but as soon as the pressure is released the spring 60 will return the piston and piston rod 59 into inoperative position and will at the same time release the transmission lever 62 from locked position. The object being to maintain the gear shift lever in locked position so long as the subframe is raised and the load rests upon the scale beams, the transmission being locked and remaining locked prevents the moving of the loaded vehicle so long as the load is carried upon the scale mechanisms and can only be moved when the load has been transferred back upon the main truck frame.

To prevent the stopping of the pump by undue pressure in the system the safety valve 44 is provided and to permit the pumping of the liquid against the pressure provided in the valve it is necessary for the pumped liquid to return to the sump tank, a pipe 65 is provided for that purpose which connects the valve from the pumping side to the sump tank.

To provide a support for the knife edge 67 a bracket 66 is provided which is attached to sill 12 of the frame, the knife edge 67 bears directly upon the hardened member 68 upon bar 15.

As hereinbefore declared, in my invention two weighing mechanisms are provided—one for the full or partial load and the other for partial shipments that may be added from time to time, or that may be removed from time to time, the weighing mechanism, and the platform being at the rear of the vehicle to provide a convenient place for the work, this secondary weighing mechanism is supported upon the subframe of the first and is raised and lowered by the hydraulic means because of that fact.

69 and 69′ are supporting beams and 70 are hardened bearing members secured thereto and upon which rest knife edges 72 and 71 and 71′ are scale beams to which the knife edges are attached. 73 is a scale supporting beam having hardened member 74 attached thereto and 75 is a knife edge resting upon the same. 76 is a hardened bearing resting upon scale beam 73′ and 77 is the knife edge that rests upon the same. 78 is a connecting link and 79 is the graduated scale beam and 80 is the supporting link, 81 are the graduations upon the graduated bar and 82 is the movable counterweight. To provide a simple locking device to lock the scale a bracket 83 is provided to which an arm 83ª is attached and having a pin 83ᵇ secured about which locking latch is journaled, this locking latch when in the down position engages with the graduated bar 81. 83′ is a weight support that engages with the outer end of the graduated scale bar and to which counterweights 85 are attached. A scale housing 86 is provided to protect the secondary scale from the elements of weather and transportation. To enable the operator to determine when his weighing platform is in a level position two spirit levels are provided, 87 to show when the platform is level crosswise and 88 to show when the same is level lengthwise. 90 are hardened seats upon the beams 71 and 71′ and 89 are the hardened knife edges that are secured to the truck platform scale 91.

Having thus described my invention, I wish to make the following claims, therefore—

1. A portable partial load and full load weighing device comprising a portable motor propelled vehicle mounting a frame and a subframe, means for supporting the subframe within the frame upon hydraulic cylinders having pistons and piston rods adapted to raising the subframe through pistons and piston rods actuated by liquid under pressure, means for supplying pressure within the cylinders by pumping, weighing mechanism mounting the subframe, and means for leveling the weighing mechanism.

2. A portable partial load and full load weighing device comprising a portable motor propelled vehicle, a frame and subframe mounting the vehicle, hydraulic means for raising and lowering the subframe, weighing mechanisms carried by the subframe, means for leveling the subframe and the weighing mechanisms, indicating means for ascertaining when the subframe is level, and means for supplying pressure by pumping to the hydraulic actuating liquid.

3. A portable partial load and full load weighing device comprising a portable motor propelled vehicle, a frame and subframe mounting the vehicle astern the driving cab, hydraulic means for raising the subframe, means for weighing carried upon the subframe, means for locking the motor transmission during period of carrying the subframe upon the hydaulic raised raising means, and means for leveling the subframe when raised.

4. A portable partial load and full load weighing device comprising a portable motor propelled vehicle, a frame and subframe carried by the vehicle, weighing devices and platforms carried upon the frame during portability and hydraulic means adapted to the raising of the weighing platforms from immediate contact with the frame during period of weighing, means for locking the transmission of the motor during weighing and means for leveling the weighing platforms.

5. A portable partial load and full load weighing device comprising a portable vehicle, one or more weighing devices carried by the vehicle adapted to being raised by hydraulic means during periods of weighing to carry the load to be weighed upon the weighing mechanisms and means for lowering the weighing load upon the vehicle frame during portability, means for leveling the weighing mechanism during weighing, means for locking the portable vehicle during weighing, and means for weighing the full load or partial loads independently.

6. A portable partial load and full load weighing device comprising a portable vehicle, one or more weighing mechanisms carried upon the portable vehicle, hydraulic means for locking the vehicle transmission shift lever during elevation of weighing platform, hydraulic means for elevation the weighing platform to position upon the weighing mechanisms, means for leveling the weighing platform, means for indicating that weighing platforms are level, and pumping means for actuating raising hydraulic means.

7. A portable partial load and full load weighing device comprising a portable vehicle having a frame mounted thereupon, a subframe normally carried upon the frame, hydraulic means adapted to elevating the subframe above the frame, weighing platforms carried upon the subframe, means for leveling the subframe and weighing platforms during elevation, power means for actuating the hydraulic elevating means, means for locking the motor transmission lever during elevation of the subframe, means for weighing the full load or partial load during elevation of the subframe, and clutch mechanisms between the motor operating means and the hydraulic pumping means adapted to being operated by a hand lever system.

8. A portable partial load and full load weighing device comprising a portable vehicle adapted to carrying a main and sub frame, weighing mechanisms and platforms normally inoperative upon the subframe but adapted to being raised independently of the main frame, and means for leveling the weighing mechanism while in raised position.

9. A portable partial load and full load weighing device comprising a portable vehicle, engine means for propelling the vehicle, a vehicle frame, a subframe supported upon hydraulic cylinders within the main frame, a hydraulic pump connected with piping and valves to the hydraulic cylinders and to a sump tank, means for operating the hydraulic pump, weighing levers and weighing platforms mounted upon the subframe, and means for leveling the weighing platform and subframe, and means for indicating when the same are level.

ALLEN SCHLABACH.